June 6, 1950
A. W. BAIRD
2,510,205
INERT GAS SHIELDED CONTINUOUS FEED METAL
ARC WELDING APPARATUS
Filed Feb. 11, 1949
2 Sheets-Sheet 1
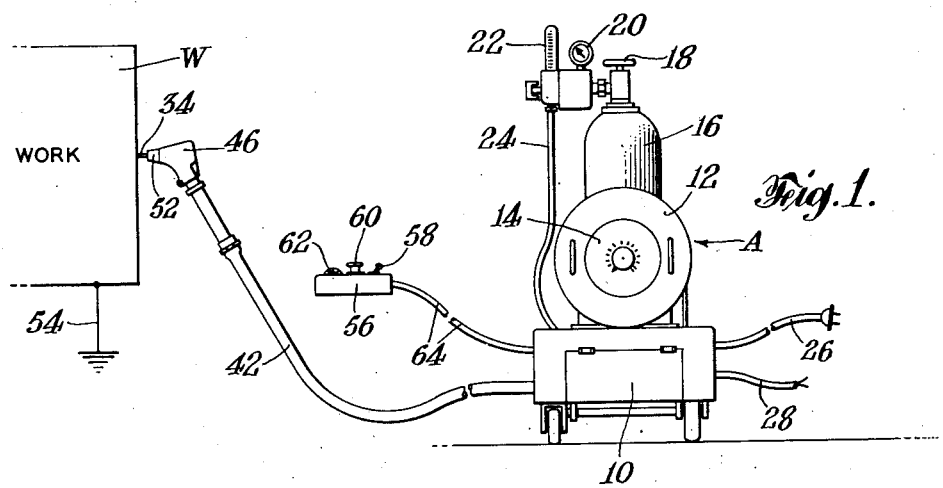
Fig. 1.
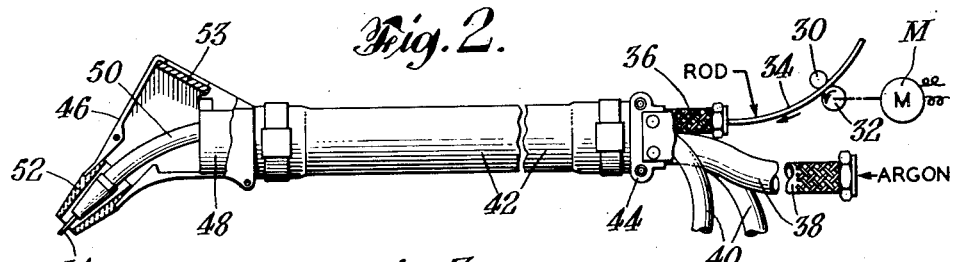
Fig. 2.
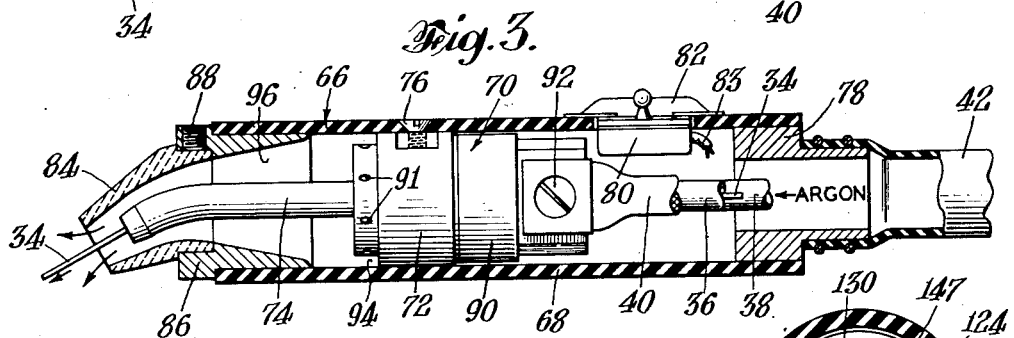
Fig. 3.
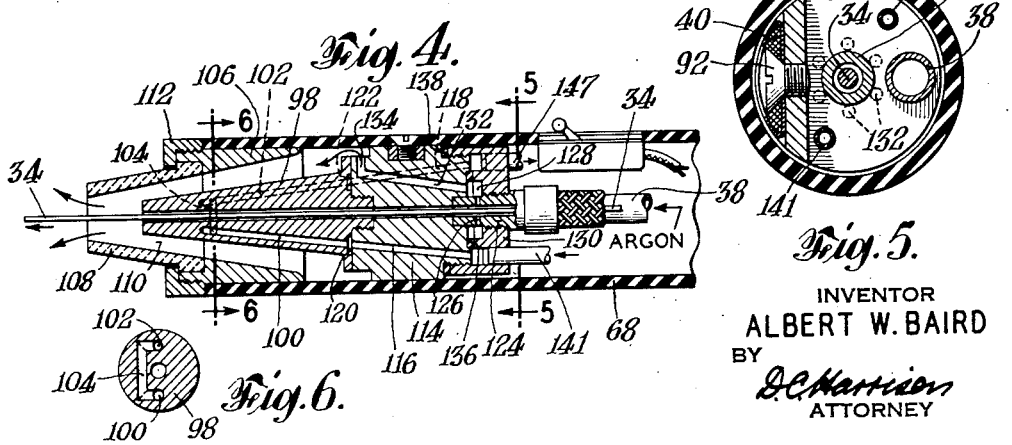
Fig. 4.
Fig. 5.
Fig. 6.
INVENTOR
ALBERT W. BAIRD
BY
D.C. Harrison
ATTORNEY June 6, 1950

A. W. BAIRD 2,510,205

Figures 7, 8:
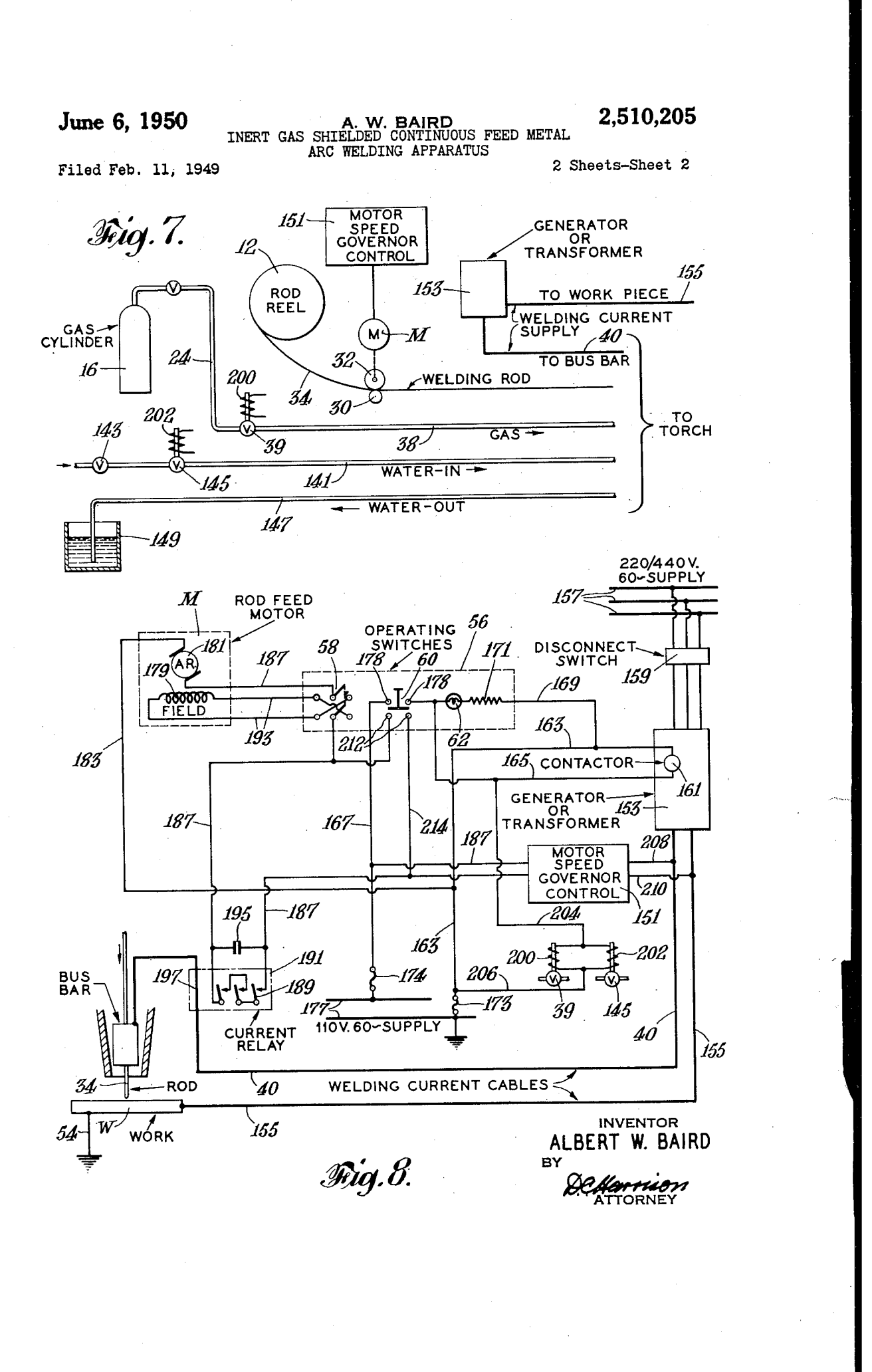

INERT GAS SHIELDED CONTINUOUS FEED METAL
ARC WELDING APPARATUS

Filed Feb. 11, 1949

INVENTOR
ALBERT W. BAIRD
BY
D.C. Harrison
ATTORNEY

Patented June 6, 1950

2,510,205

UNITED STATES PATENT OFFICE 2,510,205

INERT-GAS SHIELDED CONTINUOUS-FEED METAL-ARC WELDING APPARATUS

Albert W. Baird, Cranford, N. J., assignor to The Linde Air Products Company, a corporation of Ohio Application February 11, 1949, Serial No. 75,788

4 Claims. (Cl. 219—8)

This invention relates to electric arc welding with filler metal composed of a bare wire through which welding current is conducted and which is continuously fed to the welding zone while such welding zone is shielded by a gas stream consisting essentially of inert gas such as argon and/or helium.

This application is a continuation-in-part of my application, Serial No. 44,303, filed August 14, 1948, for Flexible submerged melt welding machine. The head of such machine is not entirely suitable for "overhead" or "vertical" welding, due to the force of gravity on the granular flux. Also the use of such granular flux renders the process unsuitable for welding certain metals. For example, submerged melt welding is not suitable for welding light metals composed principally of aluminum and/or magnesium. There is also the problem of removing unmelted granular flux and cleaning the fused and hardened flux from the weld. Aluminum, magnesium and other light metals having a relatively low melting point compared with that of steel, when fed as wire through a guide and electrical contact-nozzle which controls the direction of the path of the wire and transfers welding current to the moving wire, also tend to soften and sometimes melt within the nozzle, due to internal arcing, and heating of the nozzle because of the nozzle's proximity to the welding zone. Melting and welding of the filler metal in the nozzle also occurs when the wire feed is too slow, or stopped while the welding current is "on" and contact by the wire with the welding zone is not broken. In such case the nozzle requires considerable time and effort to repair, inasmuch as the nozzle, with the wire frozen or welded inside, must be removed from the apparatus and replaced with a new nozzle. Another problem results from contamination of the weld due to air and/or moisture entrained with the moving wire as it is fed toward the welding zone.

Therefore, the main object of the present invention is to provide a flexible welder which is suitable for overhead and vertical as well as horizontal welding without granular flux, which can also be used for welding any metal including relatively light and low melting point metals such as magnesium and aluminum, as well as for welding stainless steel, carbon steel and other metals. Another object is to provide an improved gas shielded continuous-feed metal-arc welding process. A further object is to provide a novel welding gun which is simple and economical in its parts, light in weight, easy to manipulate, and which efficiently conducts welding current to a moving metal wire electrode and, at the same time, effectively transmits and modifies the flow of inert gas so that it properly shields the electrode and welding zone from the atmosphere as well as from air which otherwise would be entrained with the wire filler metal during the welding operation. An important object of the invention is to provide improved nozzle means which serves efficiently to conduct welding current to the wire as it is fed, and smoothly to guide the wire as directed, which means is provided with efficient cooling means for keeping the metal of the wire relatively cool and, therefore, stiff—so that the wire can be continuously pushed through the nozzle without danger of stoppage due to overheating and welding of the wire in such nozzle means. A further object is to provide automatic circuit means, under the control of the operator, which insures operation of the wire feed motor so long as the welding current circuit is closed. These and other objects will be apparent to those skilled in the art from the following description.

According to the invention there is provided a flexible welder for electric welding of the type in which a bare relatively small wire of weld metal, such as stainless steel or aluminum, is fed relatively rapidly toward work composed of the metal being welded while welding current flows through such wire and the work, and the welding zone and the adjacent wire are shielded from the atmosphere with a gas stream composed principally of inert gas such as argon and/or helium during the welding operation. Such welder comprises a carriage on which means for supplying the inert gas (a cylinder containing compressed gas) and means for supplying the welding wire (a wire reel and a wire feed motor) are both mounted. A flexible hose has one end attached to the carriage, the free end of the hose being connected to a novel welding gun having coaxial nozzles through which the welding wire and gas are discharged. The hose contains flexible means for conducting gas from the carriage to the head, flexible means for transmitting the wire, and flexible welding current and control conductors. Within the gun is mounted a novel head which serves as a terminal for all of such supply means, as a brush for conducting welding current to the wire as it passes therethrough, as a distributor within the gun for the inert gas, as an air and moisture dam, and as a support for holding a welding wire contact nozzle in proper position centrally within a gas nozzle or cup. The wire contact nozzle is cooled somewhat by the gas in a gas expansion chamber and assures good conduction of welding current to the wire—especially in the curved-type form of nozzle. The head also is provided with unique means for supplying inert gas to the wire passage, so that the flow of air and/or moisture through such passage along with the moving wire is minimized by back-flow of the gas—assuring non-contamination of the weld by such air and/or moisture. As a result the gun is compact, efficient and cool in operation, and due to the flexible hose can be used for manual welding without difficulty in otherwise hard-to-get-at places; and the entire machine can be readily moved about, carrying with it the needed supplies of gas and wire for continuous use for a substantial amount of welding.

Further, according to the invention, there is provided a novel combined electric brush and gas distribution block or head in a welding gun, which guides the welding wire through the gun and changes the direction of the gas flow in such a way that the gas flows without turbulence annularly out of the gas nozzle around the welding wire as the latter emerges from its nozzle on the way to the welding zone. An automatically operated relay is provided for controlling the wire feed motor, the motor being turned "on" and "off" automatically in response to the flow of welding current, so that feeding movement of the wire through the nozzle continues as long as the welding current circuit is closed.

The welding current may be alternating or direct—reverse or positive polarity, the welding current density and wire feed being closely correlated so that melting of the wire before it reaches the welding zone is avoided.

In the drawing:

Fig. 1 is a view in elevation of a gas shielded continuous feed metal-arc welding machine illustrating the invention;

Fig. 2 is a fragmentary view of the hose, a part of the gun being broken away to show the wire nozzle;

Fig. 3 is an enlarged view in cross-section of a modification of the gun;

Fig. 4 is a view similar to Fig. 3 of another modification of the gun;

Figs. 5 and 6 are fragmentary sectional views taken on lines 5—5 and 6—6 of Fig. 4;

Fig. 7 is a flow diagram; and

Fig. 8 is a circuit diagram of the invention.

As shown in Fig. 1, a machine A comprises a wheeled dolly 10 on which are mounted a wire reel 12 containing a control box 14, and a compressed argon or helium gas cylinder 16 having a valve 18 to which is connected a gas line provided with a gas pressure regulator 20, a flowmeter 22 and a pipe 24. Electric cables 26 and 28 leading to the dolly 10 are adapted to be connected to suitable sources of control circuit current, and welding current, respectively. The dolly 10 contains a wire or rod feed motor M and suitable means including an idler roll 30 and a motor driven roll 32 for positively feeding a rod or wire 34 of filler metal from the reel 12, through a flexible tube 36. Another flexible hose 38 is connected, through a solenoid valve 39 within the dolly 10, to the gas pipe 24; and flexible welding current conductors 40 are connected to the welding current cable 28 by suitable circuit means in the dolly. Such tubes and conductors extend into a flexible hose 42 through a bushing 44 which couples one end of such hose to a suitable bracket in the dolly 10.

A welding gun 46 is coupled to the free end of the hose 42 by suitable means including a metal head or block 48 which serves as a terminal for tubes 36 and 38 and conductors 40, as well as a bus-bar or brush for conducting welding current to the wire 34, as a port for discharging into the gun gas delivered by the tube 38, and as a support for a wire contact nozzle 50 composed mainly of copper. The wire nozzle 50 is located centrally within a gas cup or nozzle 52, so that gas delivered to the interior of the gun flows outwardly therefrom in an annular stream around the wire nozzle 50—shielding the end of the wire 34 from the atmosphere as it emerges from the nozzle 50, the gas flowing over and also shielding from the atmosphere the welding zone on the work W. The gun 46 is substantially gas-tight, except for the gas inlet and outlet thereof, and is provided opposite the nozzle 52 with a removable transparent cover or window 53 which is composed of a sheet of mica or other suitable material. The work W is grounded by a conductor 54, so that the welding current flows through the metal wire 34 and the work W during the welding operation. Operation of the machine A is controlled by a handy switch box 56 containing a motor reversing switch 58, an inching switch 60 and an indicating lamp 62, which are connected to elements inside, or mounted on the dolly 10 by means of insulated wires in a flexible cable 64.

In considering the operation of the machine A, Figs. 1 and 2, the wire 34 is positioned in the gun 46 for welding by pressing and releasing the "jog" button 60 on the remote control box 56 which is electrically connected to the control means 14 in the reel 12 by suitable insulated conductors in the cable 64, the inert gas flow is then started, the welding current supply circuit is connected (upon closure of the switch 58 in the box 56) so that welding current flows when the end of the wire 34 is brought into contact with the metal work W, and the wire feed motor M automatically is energized, feeding the filler wire 34 having a diameter of the order of $\tfrac{1}{16}$ of an inch fairly rapidly to the welding zone where the metal is melted and fused on the work W under the protection of the gas discharged from the nozzle 52. The gas within the gun also protects the nozzle 50 from the oxygen in the atmosphere and cools it somewhat, at the same time being preheated before flowing over the welding zone.

The gun 46 is easy to handle and vertical and overhead welding can be accomplished with almost the same ease as underhand welding. The invention is especially suitable for welding aluminum and its alloys, since aluminum is a good electrical conductor and is flexible in the form of a wire. The transparent cover 53 enables the operator to observe the condition of the wire nozzle 50 during welding, so that the welding current circuit can be opened in case the nozzle 50 appears to be overheated.

In general the rod or wire feed should be fast enough so that melting of the rod or wire away from the welding zone, between the work and the nozzle, due to the welding current, is prevented. This is important in metals such as aluminum and the alloys thereof. For filler wire of aluminum sizes up to and including $\tfrac{1}{16}$ inch in diameter, the welding current capacity of the machine is of the order of 300 amperes, and the wire-feed rate is of the order of 300 inches per minute. In welding aluminum without flux, according to the invention, argon gas supplied at the rate of about 35 cubic feet per hour is recommended.

In Fig. 3 there is shown a modified gun 66 comprising a cylindrical handle 68 of insulating material containing a novel head 70 comprising a gas distribution and wire contactor block 72 of electrically conductive metal such as copper which also serves as a holder for the removable wire nozzle 74 and as a common terminal for the argon gas line 38, the wire conduit 36 and a welding current conductor 40. The block 72 is secured in place in the tubular handle by a screw 76. The hose 42 is attached to the handle 68 by suitable means including a bushing 78. In this modification, a manually operated control switch 80 comprising a slide button 82 is mounted on the handle 68. The switch 80 is electrically connected to the control means 14 on the dolly 10 by an insulated cable 83 which also extends through the hose 42.

In Fig. 3, as in Fig. 2, the wire nozzle 74 is curved so as to gradually change the direction of the wire 34 as it moves therethrough, and at the same time it helps conduct the welding current to the wire by brush contact, due to the tendency of the wire always to engage the internal walls of the nozzle as the wire is positively pushed therethrough, and continuously bent by the shape of the nozzle. This assures good electrical contact and helps prevent the wire from welding to the nozzle. The end of the wire nozzle 74 is surrounded by a gas nozzle in the form of a cone-shaped cup 84 of ceramic material which is removably attached to the tubular handle 68 by a suitable ferrule 86, the cup being held in place in the ferrule by a screw 88.

The block 72 is provided with a cap 90 threaded thereon and to which are attached the conductor 40 (by a screw 92), the wire conduit 36 (by a terminal nipple), and the argon gas feed line 38. The nipple is threaded through a hole in the cap 90 and projects into a socket in the block 72, providing a substantially continuous passage for the wire 34. The wire contact nozzle 74 is removably threaded into a similar socket in the front of the block. The block 70 is also provided with a gas distributing system consisting of a gas manifold in the back thereof, and a group of longitudinal gas passages arranged in a concentric circle about the longitudinal axis of the block, each of which passages terminates in a radial outlet 91 which discharges the gas into an annular recess 94 in the front of the block, so that complete distribution of the gas is effected as the gas flows into a gas expansion chamber 96 around the nozzle 74 in the handle 68. The arrangement is such that a non-turbulent stream of preheated gas is discharged from the cup 84 around the heated end of the filler metal wire 34 as the wire emerges from the nozzle 74, effectively shielding the fusing metal in the welding zone on the work from the atmosphere. The relatively long nozzle 74 very effectively conducts current to the wire 34 as the latter moves therethrough.

In some cases it is necessary to water-cool the nozzle through which the wire is fed. The modification shown in Figs. 4–6 illustrates how this is accomplished according to the present invention. The nozzle 98 is tapered externally to provide sufficient room for a cooling water inlet passage 100 and an outlet passage 102 which are connected by a cross passage 104 near the nose of such nozzle. The ferrule 106 and cup 108 are similarly tapered internally, providing a frusto-conical gas passage 110 therebetween. The cup 108 is removably secured to the ferrule 106 by a ring-nut 112. The block 114 is also provided with inclined cooling water inlet and outlet passages 116 and 118 which communicate with the passages 100 and 102 in the nozzle, through arcuate grooves 120 and 122, respectively, in the inner face of the nozzle—permitting the nozzle 98 to be screwed tightly against the block 114 without risk of shutting off the flow of cooling water.

Also, in some cases, moisture and/or air is entrained with the wire 34 as it is fed through the device, which contaminates the weld. This is overcome by the present invention, as shown in Figs. 4–6, by means of a terminal nipple 124 having radial gas passages 126 in communication with the annular gas manifold 128 between the cap 130 and the block 114. The passages 126 direct some of the inert gas to flow under pressure in the wire passage, causing some back-pressure of warm inert gas, providing a "dam" or "block" which dries the surface of the wire and effectively prevents air and/or moisture from being entrained with the wire 34 into the welding zone. In this case the gas is supplied to the head through tube 38, flowing from the manifold 128 through angularly inclined gas passages 132 in the block 114 to the radial ports 134. Suitable annular sealing gaskets 136 and 138 are provided between mating surfaces of the cap 130 and block 114 to prevent any leakage of water or gas.

As shown in Fig. 7, cooling water is supplied to the head through a flexible conduit 141 containing a shut-off valve 143 and a solenoid-valve 145. The water is conducted from the head through a flexible conduit 147 which empties in a sink 149. The motor M is regulated by a motor speed governor control 151, such as that of Patent 2,445,729, for example. The welding current is supplied by a generator or transformer 153 the output of which is conducted to the work W by a ground conductor 155 and to the wire 34 by the bus-bar conductor 40.

Referring now to Fig. 8, the generator or transformer 153 is connected to welding supply lines 157 by a disconnect switch 159 and by a relay or contactor 161 having an input circuit 163, 165. When the input circuit 163, 165 is energized and the contactor 161 is "on," making the conductors 40 and 155 "live," this condition is indicated by the illumination of the signal lamp 62 which is connected across the input circuit 163, 165 of the contactor 161 by conductors 167 and 169, the latter containing a current limiting resistance 171. The line 163 contains a safety fuse 173 and is connected to one side of a supply circuit 177. The line 169 is connected to the other side of circuit 177 through the upper poles 178 of switch 60 and a fuse 174. The rod feed motor M comprises a series field winding 179 and an armature 181. One side of the armature is connected by a wire 183 to one side of supply circuit 177 via the line 163. The other side of the armature 181 is connected to the other side of supply circuit 177 via line 187, containing the double-pole double-throw rod or wire-feed switch 58, contacts 189 of a current relay 191, and governor control 151, and line 167. The field winding 179 is connected by wires 193 to the stationary poles of such switch 58. The contacts 189 of the relay 191 are shunted by a condenser 195. The current relay 191 is provided with a portion 197 of the conductor 40, so that current flowing in the latter creates a field which closes normally open contacts 189 of the relay 191, which contacts otherwise remain open, opening the supply circuit of the motor M. Thus, when the switch 58 is closed and welding current flows in the conductor 40, the motor M runs at the speed determined by operation of the control 151.

The solenoid-valves 39 and 145 which control the flow of gas and water, respectively, have their coils 200 and 202 connected in parallel with each other across the lines 163 and 165 by conductors 204 and 206. Thus, the coils are energized by the supply circuit 177, opening the valves 39 and 145, when the inching button 60 is unlocked, connecting the upper poles 178 thereof. The motor speed governor control 151 is connected to lines 40 and 155 by conductors 208 and 210 when it is desired to control the speed of the motor M in accordance with the welding voltage. Otherwise the control may operate to keep the speed of the motor constant.

The control 151 is preferably of the electronic type disclosed and claimed in Patent 2,445,789, which is mechanically and/or electrically associated with the motor M, and operates automatically when the motor M is rotating to maintain the speed of the motor at a very constant predetermined value, if desired, so that the rod or wire 34 is fed thereby at a critical rate, which has been found to be very important in welding "hot-short" metals such as aluminum according to the invention. In the case of stainless steel, however, the control is preferably responsive to the value of the welding current voltage, so that such voltage is kept constant by the control.

In operation, the rod feed switch 58 is closed in "feed" position and the rod 34 is fed or "inched" by pushing down and closing the lower poles 212 of the switch 60. This closes a line 214 in shunt with contacts 189 of the current relay 191, energizing the motor M. When the wire or rod 34 is in the desired position, the switch 60 is released, connecting the upper poles 178, and the work W is touched with the end of the rod 34. This causes welding current to flow and the motor M to feed the rod 34 at a rate determined by the control 151, which continues until the welding action is interrupted by quickly pulling the rod out of the welding zone. This opens the welding current circuit, the current relay contacts 189 open, and the rod feed motor M stops.

The invention is quite suitable for overhead and vertical as well as horizontal welding, since it is only necessary for the operator, after making the apparatus ready, to point the wire or rod in the desired direction and then touch the work therewith. Thereupon, the rod or wire is fed automatically toward the work as the operator holds the gun stationary or moves it along a desired path at any rate he may choose, depending upon the desired thickness of the weld. The resulting welds are sound and relatively free of undesirable foreign matter, due to the operation of the air and/or moisture block or trap of inert gas in the gun.

I claim:

1. In a continuous-feed metal-arc welding gun, the combination with a tubular handle of insulating material, a gas cup removably mounted on the outer end of said handle, a block of metal removably secured within said handle and having a central passage for wire filler metal, and also having separate gas and water passages, a nozzle of metal removably mounted on the front of said block and being spaced from the inner surface of the handle and cup to provide an annular gas passage, said nozzle having a wire passage in line with the corresponding wire passage in the block, said nozzle also having a cross water passage in communication with inlet and outlet water passages communicating in turn with the corresponding water passages in the block, a metal cap mounted on the back of said block, a flexible wire conduit having a terminal nipple mounted in a hole in said cap and extending into a socket in said block concentric with said wire passage, said cap and block having means providing an annular inert gas distributing manifold in communication with said gas passages in the block, and separate arcuate water transfer spaces in communication with said inlet and outlet water passages in the block, inlet and outlet water pipes connected to said cap, and a welding current supply line also connected to said cap.

2. In a continuous-feed metal-arc welding gun, the combination as defined by claim 1, in which the terminal nipple is provided with lateral gas passages in communication with said inert gas manifold, whereby inert gas flows into the filler-wire passage under pressure and minimizes the flow of atmospheric air and moisture with the filler wire into the nozzle.

3. In a gas shielded metal-arc welding gun, a tubular handle of insulation material containing a combined gas distributing and electrical contact block of metal secured therein, said block having an axial passage for guiding wire, a nozzle of metal removably secured to the front of said block and having a wire passage in line with the corresponding passage in the block, a cap of metal mounted on the back of said block, a wire supply conduit having a terminal nipple extending through and fitting an axial hole provided therefor in the cap and fitting in a socket in the back of the block, the end wall of the cap being spaced from the end of the block and providing a gas manifold, a gas supply pipe connected to said cap for delivering gas under pressure to said manifold, a welding current supply line having one end connected to said cap, said block having a plurality of gas passages in communication with said gas manifold for conducting the gas to a space in the tubular handle in front of the block around the nozzle, and a gas discharge cup removably connected to the front end of said handle in spaced relation to said nozzle.

4. In an inert-gas shielded continuous-feed metal-arc welding gun, the combination with an inner nozzle having a passage through which filler metal wire is fed and welding current is conducted to such wire, and outer nozzle means including a gas cup for flowing inert gas in an annular stream over said nozzle and the wire and the welding zone as the wire emerges from the nozzle, of common head means for conducting welding current to said nozzle and also conducting inert gas to said outer nozzle means, said common means comprising a metal block to which said inner nozzle is removably attached, said block having a wire passage in line with the corresponding passage in the inner nozzle, and said block also having longitudinal inert-gas supply passages leading to an annular space between said inner nozzle and said outer nozzle means; said head means being also provided with inert-gas supply passages leading to the wire passage, so that air and moisture entrained with the wire is prevented from entering the welding zone, by back-pressure of the inert gas.

ALBERT W. BAIRD.

REFERENCES CITED

The following references are of record in the file of this patent:

UNITED STATES PATENTS

| Number | Name | Date |
|---|---|---|
| 1,644,237 | Christensen | Oct. 4, 1927 |
| 1,746,207 | Alexander | Feb. 4, 1930 |
| 1,953,915 | Burgett | Apr. 3, 1934 |
| 2,376,265 | Meredith | May 15, 1945 |
| 2,468,804 | Breymeier | May 3, 1949 |